US007055418B2

(12) United States Patent
Maddalon

(10) Patent No.: US 7,055,418 B2
(45) Date of Patent: Jun. 6, 2006

(54) DEVICE FOR TRIMMING AND AUTOMATIC CUTTING OF IMAGES ON PAPER AND OTHER GRAPHIC AND PHOTOGRAPHIC SUBSTRATES, IN PARTICULAR OF LARGE SIZE

(75) Inventor: Valter Maddalon, Pralungo (IT)

(73) Assignee: Fotoba International S.r.l., Quaregna (IT)

( * ) Notice: Subject to any disclaimer, the term of this patent is extended or adjusted under 35 U.S.C. 154(b) by 536 days.

(21) Appl. No.: 10/264,036

(22) Filed: Oct. 3, 2002

(65) Prior Publication Data

US 2003/0033918 A1 Feb. 20, 2003

Related U.S. Application Data

(63) Continuation of application No. PCT/IT01/00131, filed on Mar. 15, 2001.

(30) Foreign Application Priority Data

Apr. 6, 2000 (IT) .......................... MI2000A0740

(51) Int. Cl.
*B23Q 15/26* (2006.01)
*B26D 5/20* (2006.01)
*B26D 7/26* (2006.01)
*G03D 15/04* (2006.01)

(52) U.S. Cl. .............................. 83/72; 83/364; 83/365; 83/368; 83/614; 83/948

(58) Field of Classification Search .................... 83/72, 83/74, 76.8, 364, 365, 367, 368, 948, 33–36, 83/209–211, 216, 360, 370, 371, 614, 636
See application file for complete search history.

(56) References Cited

U.S. PATENT DOCUMENTS

| | | | | |
|---|---|---|---|---|
| 3,133,466 | A * | 5/1964 | Seifert | 83/211 |
| 3,443,867 | A * | 5/1969 | Scheffel | 83/365 X |
| 3,811,768 | A * | 5/1974 | Zahn et al. | 83/365 X |
| 4,475,422 | A * | 10/1984 | Lawson | 83/76.8 X |
| 4,541,317 | A | 9/1985 | Van Humbeeck et al. | |
| 4,697,485 | A | 10/1987 | Raney | |
| 5,079,981 | A | 1/1992 | Singer et al. | |
| 5,360,161 | A * | 11/1994 | Schaller et al. | 234/42 |
| 5,586,479 | A | 12/1996 | Roy et al. | |

(Continued)

FOREIGN PATENT DOCUMENTS

EP 0 251 802 * 1/1988

(Continued)

*Primary Examiner*—Clark F. Dexter
(74) *Attorney, Agent, or Firm*—Akin Gump Strauss Hauer & Feld LLP

(57) ABSTRACT

A device for trimming and automatically cutting of either multiple or single images, the images produced for example through digital rendering on paper and other graphic and photographic substrates, wound in reel or being in single sheets (10), especially of large size. Problems in using known devices of this type with feeding rollers (2) with a length corresponding to the substrate width have the consequence of a slowing down of the production owing to the excessive care necessary when introducing at the same time parallel sheets of large size. These problems can be overcome by using rollers of reduced length, but only by adding errors in the forward movement of the substrate, errors which are remedied by of optical sensors (4, 4') for detecting the separation mark (M) between the images (10*a*, 10*b*, . . . ) as well as its angle with respect to the cutting line (7), and by a pair of length differential measuring devices (6).

6 Claims, 3 Drawing Sheets

U.S. PATENT DOCUMENTS

| | | | | |
|---|---|---|---|---|
| 5,644,979 | A * | 7/1997 | Raney | 83/368 X |
| 5,794,526 | A | 8/1998 | Raney | |
| 5,839,688 | A * | 11/1998 | Hertel et al. | 83/74 X |
| 6,196,098 | B1 * | 3/2001 | Hagiwara et al. | 83/76.8 X |
| 6,820,526 | B1 * | 11/2004 | Maddalon | 83/76.8 |
| 6,907,806 | B1 * | 6/2005 | Okamoto et al. | 83/76.8 |
| 2004/0182211 | A1 * | 9/2004 | Maddalon | 83/74 |

FOREIGN PATENT DOCUMENTS

| | | | |
|---|---|---|---|
| EP | 0 563 861 | A1 | 10/1993 |
| EP | 0 951 973 | A1 | 10/1999 |
| JP | 61-35933 | * | 2/1986 |
| WO | WO 03/035340 | * | 5/2003 |

* cited by examiner

DEVICE FOR TRIMMING AND AUTOMATIC CUTTING OF IMAGES ON PAPER AND OTHER GRAPHIC AND PHOTOGRAPHIC SUBSTRATES, IN PARTICULAR OF LARGE SIZE

CROSS-REFERENCE TO RELATED APPLICATIONS

This application is a Continuation of International Application No. PCT/IT01/00131, filed Mar. 15, 2001, which was published in the English language on Oct. 18, 2001, under International Publication No. WO 01/76833 A1 and the disclosure of which is incorporated herein by reference.

BACKGROUND OF THE INVENTION

The present invention relates to a device for trimming and automatic cutting of multiple images or a single image, obtained in particular by digital rendering on paper or other graphic or photographic supports wound in rolls or in the form of single sheets, especially of large size.

It is known from publication EP-A-0951973, in the name of the same applicant, to provide an automatic cutting device which allows to separate one by one multiple copies in a rapid and precise manner according to the positioning as set by the software of the digital rendering system itself in the printing stage by previously inserting between the copies or prints, where the cutting is required, marks of optical reflection, easily detectable by continuous scanning. In this way the angular correction of the cut can be carried out either with respect to a mark, as it was made previously, at the edge of an opaque material being laminated onto a transparent material, or with respect to images printed not at right angles to the substrate. It was thus possible to obtain the cutting on substrates in the form of reels or as sheets, even if free from any guide system.

On the other hand it is known that more recently the market has shown the need of extending, up to doubling its value, the maximum size of the cutting units to be used with paper sheets having a length greater than one meter. In this case, some difficulties are met when introducing the substrate into the cutting unit, in both cases of a continuous reel or of single sheets, if the pair of feeding rollers extends throughout the cutting length. Due to the material flexibility and weight in fact the parallel and simultaneous introduction of the total sheet width cannot be ensured. If an angle of the sheet is introduced with some delay with respect to the remainder of the sheet itself or of the unwinding reel, the substrate would reach the cutting station in an incorrect position and, while trying to recover the error upon control of the optical sensors detecting the same, the feeding rollers would cause unacceptable wrinkling of the substrate itself.

On the other hand, the substrate introduction steps which require excessive care in the alignment would involve too much labor being engaged, thus lengthening the time of production to become anti-economic to the detriment of the advantages which could be obtained with the above-mentioned prior art as described in the said EP publication. Therefore a solution appears to be that of adopting a pair of feed rollers having a reduced length with respect to the cutting length, such as to occupy only the central zone of the support width. In this way, since the feeding rollers have more orientation freedom, there is no problem with an imperfect alignment at the paper introduction, which thereby requires less care and allows a speedier cutting execution. However there is a derived problem, consequent to the fact that, upon detecting the mark through both the sensors, the possible angle of deviation from a correct feed, the substrate with the associated mark is caused to be fed under the control of the microprocessor through a length corresponding to the distance between the reading system and the cutting line. When travelling along said feed length, also called "offset", the paper substrate must keep the same angle as initially detected by the sensors. However, for reasons of weight and/or friction, combined with the substrate being held only in a restricted central area, it cannot skid from the rollers nip and modify the feed angle with respect to the cutting station, once concluded the offset transportation.

BRIEF SUMMARY OF THE INVENTION

Therefore it is an object of the present invention to overcome such possible drawback by providing a correction system for the cutting unit position corresponding to the possible error resulting from the paper substrate skidding, thus having again the cutting at a correct position even if the paper feed is provided free of any guide system.

According to another aspect of the present invention it is also proposed to avoid the inconveniences deriving from the use of only one motor, according to the prior art, for positioning the cutting unit with consequent excessive mechanical flexibility and the control sensibility being dependent in function of the working plane. To this effect a preferred embodiment of the present invention provides for two angular motors placed at the side ends of the cutting unit and synchronized by the microprocessor such as to simulate the central pivoting of the cutting blades in spite of their lateral guide.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
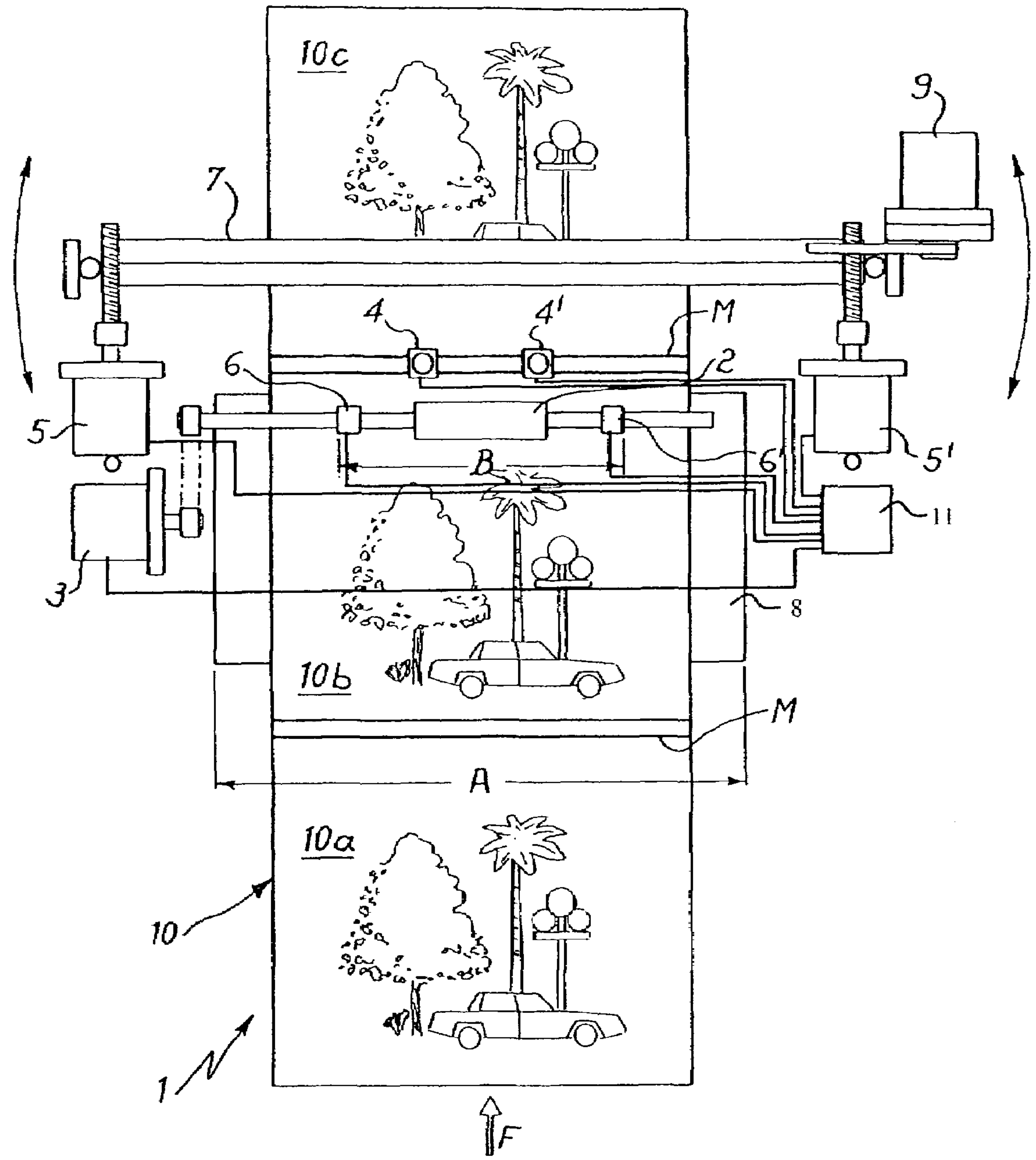
FIG. 1 shows a diagrammatic top view of a trimming and cutting device according to the present invention with the substrate of images correctly fed and the cutting unit being aligned with the feeding rollers.

With reference to the drawings there is shown a device 1 according to the present invention for the automatic trimming and cutting of images 10*a*, 10*b*, 10*c* printed in a traditional way or obtained by digital restituting systems on a substrate 10 formed e.g., as a continuous paper reel but which could instead be formed of single sheets. The successive images 10*a*, 10*b*, 10*c* are separated by separation marks or boundary lines M which can be detected optically by a pair of optical 4, 4' along an ideal reading line that is perfectly transverse to the feed direction as indicated by the arrow F. The feed of substrate 10 is driven by at least a pair of rollers 2, of which only the one above the substrate 10 is visible. As already said before, the length of the feeding rollers 2, useful to hold the substrate 10, is reduced with respect to the total width of the mobile cutting device 7 and also to the width A of the working table 8 of the device. They are in a central position with respect to the substrate 10 and are driven by a motor 3.

According to the present invention at the sides of the pair of rollers 2 there are provided two differential length gauges 6, 6' or "encoders" having a mutual distance B which is larger than the length of rollers 2 and shorter than said width A. When the substrate 10 is perfectly introduced, as shown in FIG. 1, the optical sensors 4, 4' detect an angle zero and the two differential length encoders 6, 6' detect a likely identical feed of the substrate 10 starting from the moment at which the mark M is detected by the optical sensor 4, 4' until the end of the feed movement or "offset" being controlled by a microprocessor 11, corresponding to the distance between the reading point or line as defined by the optical sensors 4, 4' and the working line of the cutting unit 7. If the feed is identically detected by the two "encoders" 6, 6', it means that there are no angular errors to be taken into account for the cutting and this will be accomplished under control of motor 9, along a line perfectly parallel to the separation mark M.

Figure 2:
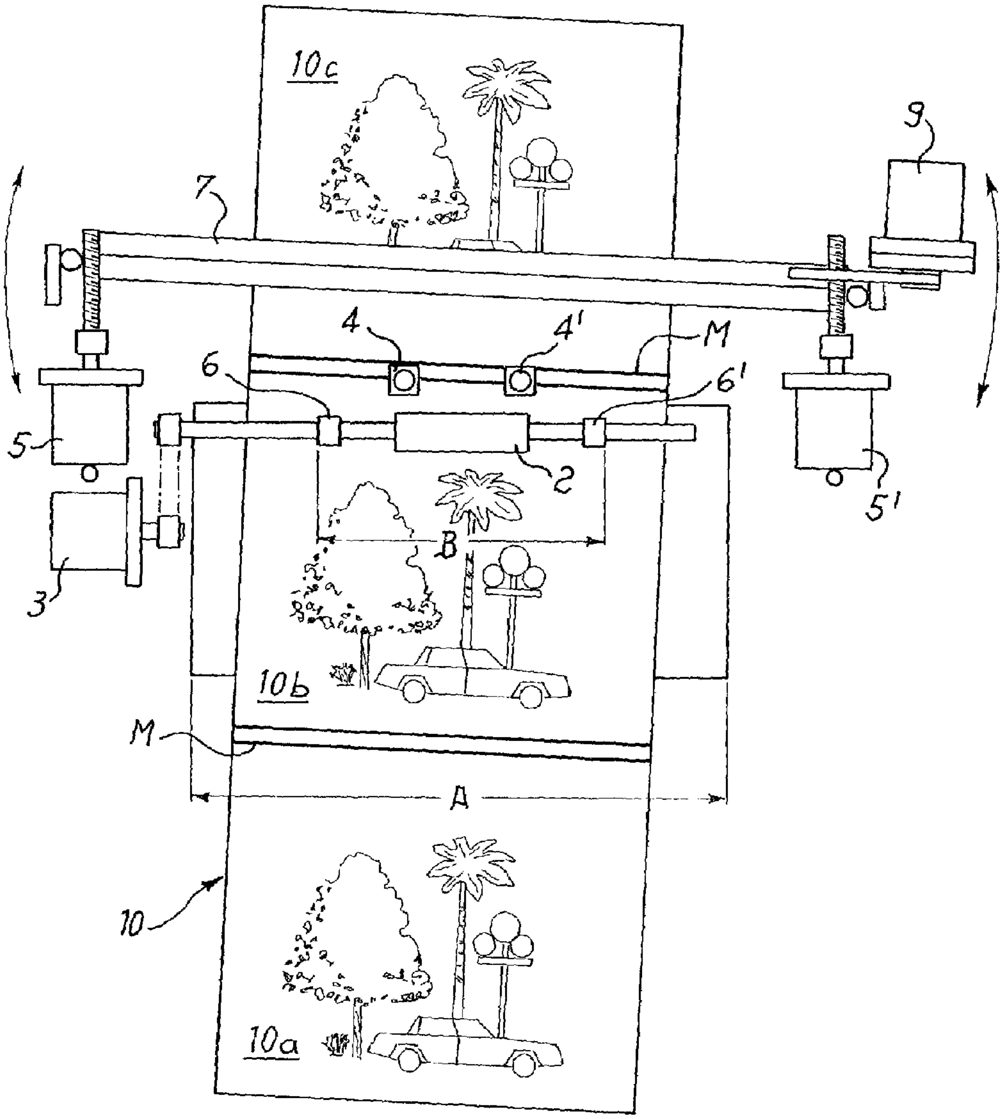
FIGS. 2 and 3 show the same device of FIG. 1 with the substrate of images inserted with two opposite angles with respect to the feed, at a right angle with respect to the cutting unit, before intervention of the foreseen means of automatic correction.
Figure 3:
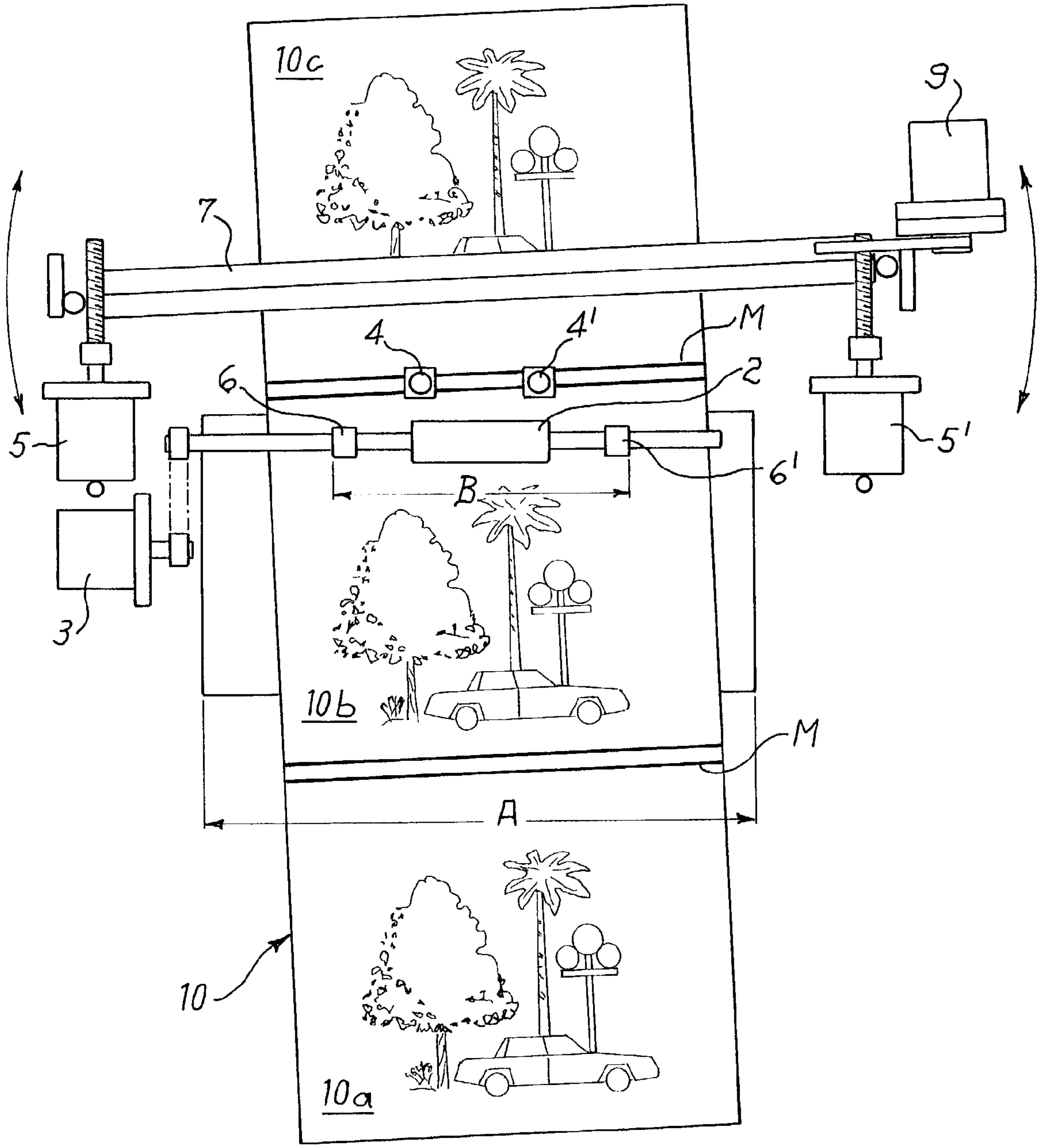

If instead, as it is likely that happens in situations as represented in FIGS. 2 and 3, in addition to the initial angular error due to the imperfect feed of substrate 10, the two encoders 6, 6' detect different "offset" lengths during the shift automatically controlled by the microprocessor, this means that the nip of the rollers 2, which is of limited extension in the central zone, and due in particular to the weight of the paper substrate, causes a skidding. In this way the angle shown by the mark M against the cutting units 7 after the "offset" feed will be modified and to correct the same the device of the present invention will be useful. In fact, the angular error will correspond to the feed difference as detected by the two encoders 6, 6' at the side of rollers 2. The relevant differential data are supplied to the microprocessor which causes its algebraic sum with the possible angle of entering error, whereby the control pulse to the two motors 5, 5' can correct the cutting position to the same extent as the error given by the skidding of material. The drive of the two motors 5, 5', which are placed at the end sides of the cutting unit 7, is synchronized by the microprocessor such as to simulate, with two lateral guides, a central pivoting of the cutting unit itself.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A device for trimming and automatically cutting images (10*a*, 10*b*, 10*c*) printed on graphic and photographic substrates in the form of a reel or single sheets, the substrates having an optical recognizing mark (M) between successive images, the device comprising:

a movable cutting unit (7) having a cutting blade operated by a cutting-blade motor (9), the cutting blade defining a cutting line extending in a transverse direction relative to a feed path and having a cutting-line length, the movable cutting unit operatively coupled to at least one cutting-unit angular adjustment motor (5, 5') to angularly adjust an orientation of the cutting unit (7) for adjusting an angular orientation of the cutting line;

a pair of feed rollers (2) extending in a transverse direction relative to the feed path and driven by a feed-roller drive motor (3), the pair of feed rollers (2) having a nip length less than the cutting-line length for engaging a central portion of a width of the substrate and feeding the substrate along the feed path;

a pair of optical sensors (4, 4') between the pair of feed rollers (2) and the movable cutting unit (7), the pair of optical sensors (4, 4') configured to detect one of the optical recognizing marks (M);

two length differential measuring devices (6, 6') configured to detect different feed lengths of the substrate (10) as the substrate passes the two length differential measuring devices (6, 6'); the pair of feed rollers (2) being positioned between the two length differential measuring devices (6, 6'); and a microprocessor (11) in communication with the pair of optical sensors (4, 4'), the two length differential measuring devices (6, 6'), and the at least one cutting-unit angular adjustment motor (5, 5'), and configured to control the orientation of the cutting unit (7) based on substrate entry-angle data from the pair of optical sensors (4, 4') and based on substrate skid-angle data from the two length differential measuring devices (6, 6').

2. The device according to claim 1, wherein the microprocessor is configured to determine a substrate-entry angular error based on the substrate entry-angle data and a substrate-skid angular error based on the substrate skid-angle data and to control the orientation of the cutting unit (7) based on an algebraic sum of the substrate-entry angular error and the substrate-skid angular error.

3. The device according to claim 2, wherein the substrate-skid angular error corresponds to a feed difference as detected by the two length differential measuring devices (6, 6').

4. The device according to claim 3, wherein the feed difference is based on a shift of the substrate, the shift being controlled by the microprocessor (11) and having a shift length corresponding to a distance between the pair of optical sensors (4, 4') and the cutting line.

5. The device according to claim 1, further comprising a working table (8) having a width (A), and wherein the length differential measuring devices (6, 6') are placed at opposed sides of the pair of feed rollers (2) such that a total distance (B) therebetween is less than the width (A) of the working table (8).

6. The device according to claim 1, wherein the at least one cutting-unit angular adjustment motor (5, 5') comprises a first cutting-unit angular motor (5) and a second cutting-unit angular motor (5') placed at opposed ends of the cutting unit (7), the first and second cutting-unit angular adjustment motors (5, 5') synchronized by the microprocessor (11) to pivot the cutting unit (7) about a generally geometric center of the cutting unit (7).

* * * * *